United States Patent [19]

Krieg

[11] Patent Number: 5,233,228
[45] Date of Patent: Aug. 3, 1993

[54] CONTROL DEVICE FOR THE MANUAL ADJUSTMENT OF REVERSIBLE ELECTRICAL ADJUSTING DEVICES

[75] Inventor: Karl-Heinz Krieg, Ebersbach, Fed. Rep. of Germany

[73] Assignee: Mercedes Benz AG, Fed. Rep. of Germany

[21] Appl. No.: 670,756

[22] Filed: Mar. 15, 1991

[30] Foreign Application Priority Data

Mar. 17, 1990 [DE] Fed. Rep. of Germany ....... 4008641

[51] Int. Cl.$^5$ .................. B60R 16/02; H03M 11/00; H01H 13/76
[52] U.S. Cl. .................................. 307/10.1; 200/4; 200/6 A
[58] Field of Search ............... 200/4, 6 A; 307/10.1; 318/257, 258, 543; 340/825.52

[56] References Cited

U.S. PATENT DOCUMENTS

| | | | |
|---|---|---|---|
| 3,731,013 | 5/1973 | Nightengale | 200/4 |
| 4,245,137 | 1/1981 | Hirai et al. | 200/4 |
| 4,273,971 | 6/1981 | Tregurtha | 200/4 |
| 4,871,953 | 10/1989 | Anstee | 318/466 |
| 4,894,650 | 1/1990 | Krieg et al. | 200/4 X |
| 4,940,322 | 7/1990 | Hamamoto et al. | 307/10.1 X |

FOREIGN PATENT DOCUMENTS

| | | |
|---|---|---|
| 0274848 | 7/1988 | European Pat. Off. |
| 3507000 | 8/1985 | Fed. Rep. of Germany. |
| 8716486 | 1/1988 | Fed. Rep. of Germany. |
| 3721267 | 1/1989 | Fed. Rep. of Germany. |
| 3805354 | 8/1989 | Fed. Rep. of Germany. |
| 3819471 | 12/1989 | Fed. Rep. of Germany. |
| 2155876 | 10/1985 | United Kingdom. |

Primary Examiner—Jeffrey A. Gaffin
Assistant Examiner—Fritz M. Fleming
Attorney, Agent, or Firm—Evenson, McKeown, Edwards & Lenahan

[57] ABSTRACT

A control device for adjustment of reversible electrical adjusting devices, in particular of motor vehicle rear-view mirrors, having a selector switch which can be switched by means of a knob between a multiplicity of stable switching positions for selection of a mirror to be adjusted, and three tip switches, which can be switched by the same knob for the actual control of the adjusting device. A four-digit binary code, composed of signals of the selector switch and of the tip switches, is generated at four connection terminals of the switch arrangement by actuating the knob while maintaining the set position of the selector switch. In a fourth stable switching position of the selector switch, the switching contact of the said selector switch is not in contact with any of the fixed contacts assigned to it and the downstream connection terminals are potential-free. The fourth switching position of the selector switch can be used for the activation of further functions, preferably both outside rear-view mirrors of the vehicle can thereby be retracted and deployed under remote control, and a memory circuit can be made to store mirror positions manually/electrically set beforehand.

13 Claims, 2 Drawing Sheets

CONTROL DEVICE FOR THE MANUAL ADJUSTMENT OF REVERSIBLE ELECTRICAL ADJUSTING DEVICES

BACKGROUND AND SUMMARY OF THE INVENTION

This invention relates to a control for the manual adjustment of multiple reversible electrical adjusting devices.

A control of the generic type is disclosed in German patent document DE 37 21 267 A1 in which three electrically adjustable motor vehicle rear-view mirrors are controlled by means of a single switch knob of a switch arrangement, which serves both for selection of the mirror to be adjusted and for its actual adjustment. The special advantages of this known arrangement are that, with clearly evident operation of the knob, all the electric control signals are transmitted in the form of a four-digit binary code from the switch arrangement via four outer electric connection terminals and a multiple lead cable to a separately arranged electronic decoding and control circuit. In the known control device, electric potential of a common connection terminal of the switch arrangement is applied at least to one of the fixed contacts of the selector switch, and consequently to at least one of the two outer connection terminals connected downstream of these fixed contacts, in every actuating position of the knob.

The object of the present invention is to provide a control device of the generic type in such a way that at least one further control function can be performed with it.

The range of selection of the known control is extended according to the invention beyond the prior art selection positions of the knob or switching positions of the selector switch, by adaptation of the knob for further movement (in the case of a rotatable knob preferably by rotation through 180° starting from a previous central position) into an additional stable switching position. This improvement permits the control of at least one further function, again in an accustomed way, by tilting the knob out of its neutral starting position.

In contrast to the known control device or switch arrangement, in the additional stable switching position of the selector switch the two fixed contacts thereof (and the connection terminals of the switch arrangement connected to them) are potential-free even upon actuation of the knob. The tip switch, however, which is connected in series with the selector switch, continues to feed the electric potential of the joint connection terminal to the switching contact of the selector switch in every actuating (e.g. tilting) position of the knob other than the neutral position.

Thus according to the invention, the four-digit binary code of the known control device or switch arrangement provided when the knob is actuated, is extended without adding further switching or fixed contracts, by four possible combinations or permutations, one of which however corresponds to the "null permutation" in the neutral position of the knob and cannot be used for control purposes. However, as a result when the knob is actuated out to the additional—fourth—selection position, three more signals, distinguishable from the previously possible permutations, can be transmitted via the two other connection terminals.

The added function can preferably be utilized for the remote-controlled extension and retraction of the two outside rear-view mirrors, each provided with a reversible adjusting device for this purpose. It is of use for example in car washes or in narrow gate entrances to avoid damage to the outside rear-view mirrors projecting beyond the basic contours of the vehicle. Correspondingly equipped outside rear-view mirrors are known. (See German patent document DE 38 19 471 A1.) To control this function, at least two of the three additional permutations must be used.

Also known (e.g., German patent document DE 35 07 000 A1) is an adjusting device for motor vehicle rear-view mirrors with which, along with the usual fine adjustments of the outside rear-view mirrors selectable by means of a separate switch knob, it is also possible to control their extension and retraction, which can be effected by their own electric motor. Nevertheless, for the latter operations as well, two individual switch knobs are provided, and the electrical control used is of a conventional type.

Also known are outside rear-view mirrors for motor vehicles (e.g., German patent documents DE 38 05 354 C1, DE 87 16 486.3 U1) in which one of the two adjusting devices provided for fine adjustment can also be used to extend and retract the mirror housings. However, as a rule, such adjusting devices are quite slow, because it is intended to permit a precise positioning of the mirror surface in relation to the point of the vehicle driver's eyes. Such adjusting devices therefore seem less suitable for the purpose of extending and retracting the entire mirror—which is to take place quickly in order to avoid undesired waiting time. For this reason, the device disclosed in the second-mentioned of the above two publications has a central control unit that permits a changing of the rotational speed of the motor depending on the desired adjustment (fine adjustment or extension/deployment). However, the switch arrangement with which the adjustment and the speed change-over are controlled is not disclosed in any further detail.

According to an advantageous embodiment of the present invention, the additional permutations of the binary code can be used selectively, so that, when the knob is located in the fourth selection position and is actuated in one direction, one outside rear-view mirror is retracted and, when the knob is actuated in the other, opposite direction, the other outside rear-view mirror is retracted. It is of course necessary to maintain as far as possible the clearly evident actuating direction by having a knob which can be moved or tilted sideways—i.e., in the additional switching position of the selector switch or the knob. Thus "move to the right" or "move to the left" is converted by the decoding and control circuit into "retract on the right" and "retract on the left", respectively.

In such an arrangement, the third additional permutation is expediently used for outward extension of both outside rear-view mirrors. In this case, of course, only the corresponding adjusting device of a previously retracted outside rear-view mirror is activated.

However, if both outside rear-view mirrors are always to be retracted and extended jointly, utilizing only two of the additional permutations, the third additional permutation can also be used in an advantageous way to cause a mirror-position memory circuit, provided in the control device, to store the mirror position which has been set immediately beforehand. In this case, the "inconvenience" of the additional required step of moving the knob from its previous pattern into the fourth selection position in order to effect such storage serves the salutary purpose of preventing to the greatest extent undesired storing over already stored mirror positions, which can quite possibly happen with the usual separate storing buttons. The stored mirror positions can be called up in a way that is known per se by means of a separate button.

If there are a plurality of memory locations for mirror positions—which are often offered with a frequent change of user in mind—the "storing" buttons provided are only used from then on for the preselection of the memory location and for calling up its contents, while actual storage can only be performed by means of the adjusting knob, which is thereby given an acknowledging function.

It goes without saying that the switch arrangement of the control device according to the invention, the mechanical construction of which corresponds largely to that of the switch arrangement defining the generic type, also includes all its other advantages; that is, its clearly evident operation in mirror selection, the ergonomic design of the knob and its capability of being illuminated.

Other objects, advantages and novel features of the present invention will become apparent from the following detailed description of the invention when considered in conjunction with the accompanying drawings.

DETAILED DESCRIPTION OF THE DRAWINGS

Figure 1:
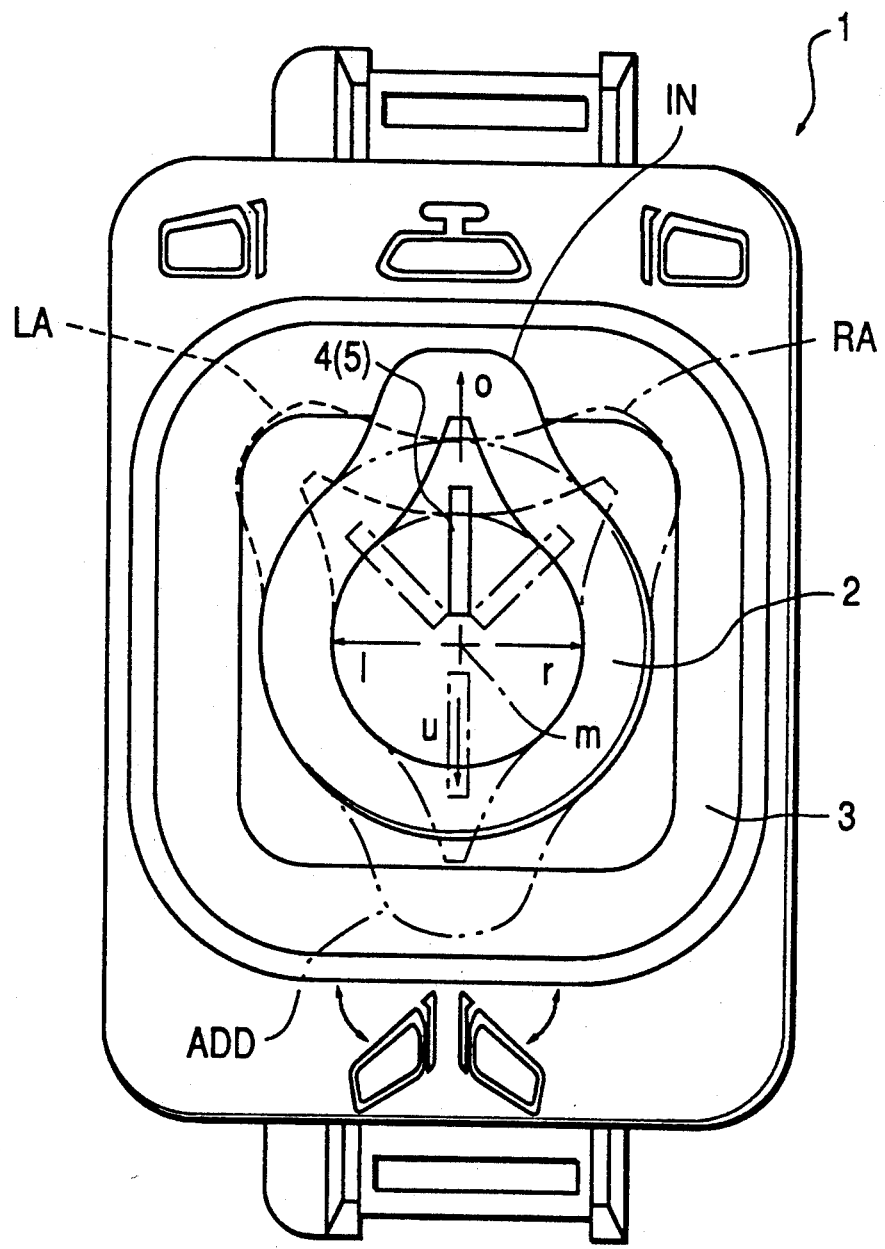
FIG. 1 shows a view of the switch arrangement of the control device according to the invention.

In FIG. 1, a switch arrangement 1 is provided with a knob 2, which is mounted so as to be rotatable with respect to a base 3 about an axis m—the longitudinal or vertical axis of the knob 1 running perpendicular to the plane of the drawing—into four stable switching positions: IN (solid), LA (dashed), RA (dot-dashed) and ADD (dash/double-dot lines). In each of these stable switching positions, the knob is tiltable out of the axis m in tilting directions o - u and l - r, which are indicated by arrows and lie in two mutually perpendicular planes, as, for example, in the case of a computer joystick.

The particular adjustments of the mirrors which can thereby be effected and the electrical connection of the switch arrangement are not the subject of the invention. They have already been described at length in the publication defining the generic type, and are not described in further detail here. It should only be noted that the mirror adjustment activated in each case corresponds in a known way, and in a clearly evident manner, to the actuating direction of the knob.

The knob 2 is advisedly designed from an ergonomic viewpoint in the form of a pointer, in order that its respective switching position—which corresponds to one of the stable switching position of the co-rotatable selector switch 9 (FIG. 2)—can also be felt without looking. Furthermore, an elongated window panel 4 provided in the upper surface of the knob 2 is illuminated by a light source 5 (FIG. 2), for example after switching on the vehicle side lights, and optically marks the switching position of the knob eve in darkness.

The switching position ADD lies opposite the (central) switching position IN: the knob 2 must be turned through 180° out of the central switching position, in order to reach the position ADD. The direction in which the knob is turned is immaterial in this case. However, for reasons of the switching mechanism (not shown), it may be necessary to allow only one turning direction. In the switching positions RA and LA, opposite the knob 2 there is in each case a symbol for the respective outside rear-view mirror (right or left), in the switching position IN it points to a symbol for an inside rear-view mirror. The switching position ADD is assigned two symbols for both outside rear-view mirrors, additional arrows indicating that, in this stable switching position of the selector switch or of the knob, both outside rear-view mirrors can be retracted in their entirety against the vehicle body or extended again from the latter, by tilting the said selector switch or knob upwards/forwards or downwards/backwards.

Figure 2:
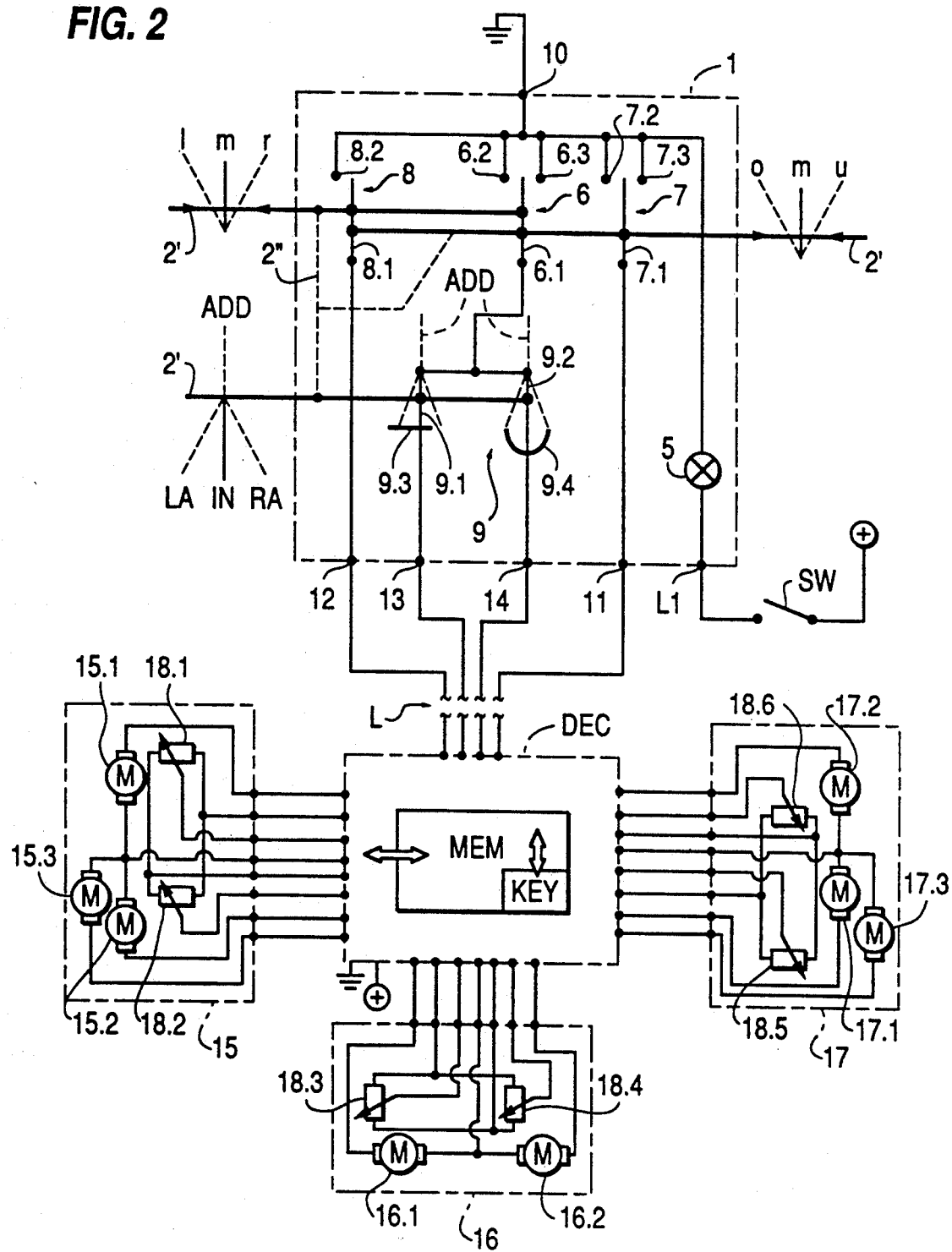
FIG. 2 shows a partial schematic circuit diagram of the control device according to the invention.

The circuit diagram in FIG. 2 shows a partial schematic diagram of the switch arrangement, which is largely similar to those of the switch arrangement defining the generic type. Along with the light source 5 already mentioned, it includes a first tip switch 6 having a switching contact 6.1, a first fixed contact 6.2 and a second fixed contact 6.3; a second tip switch 7 having a switching contact 7.1, a first fixed contact 7.2 and a second fixed contact 7.3; the first and second tip switches 6 and 7 being represented in FIG. 2 in the neutral central position of their respective switching contact 6.1 and 7.1; a third tip switch 8, designed as a single-pole button, having a switching contact 8.1, which is drawn in its opened position, and a single fixed contact 8.2; and a selector switch 9 having a switching contact, divided into two contact pieces 9.1 and 9 2, firmly coupled mechanically to each other, and two fixed contacts 9.3 and 9.4

Six outer connection terminals are provided on the switch arrangement as follows:

a first connection terminal 10 is firmly connected to all the fixed contacts 6.2, 6.3, 7.2, 7.3 and 8.2 of the tip switches 6, 7 and 8, and is for its part connected for example to ground potential of an on-board voltage source.

A second connection terminal 11 is firmly connected to the switching contact 7.1 of the tip switch 7.

A third connection terminal 12 is firmly connected to the switching contact 8.1 of the tip switch 8.

A fourth connection terminal 13 is firmly connected to the fixed contact 9.3 of the selector switch 9.

A fifth connection terminal 14 is firmly connected to the fixed contact 9.4 of the selector switch 9.

A sixth connection terminal LI is firmly connected to the light source 5 and is connected on the other side to a light switch SW, by means of which the light source 5 can be switched on. The light switch SW will preferably be the side-lights switch of the vehicle.

All mentioned switches 6 to 9 are drawn in the position which they assume when the knob 2 is unactuated, in the selection position IN. All the switching contacts of the tip switches 6 to 8 are then obviously potential-free. The dashed lines 2" connecting the three "part" knobs 2' (which for the sake of explanation are depicted separately in FIG. 2) indicate symbolically their actual unification in the single knob 2, shown in FIG. 1. Oppositely pointing arrow tips on the ends of the knobs 2' indicate symbolically that the single knob 2 can, after deflection in the corresponding directions into one of the "unstable" positions o-u and l-r, be returned by springs or the like into the position shown.

By turning knob 2 about its longitudinal axis m, the selector switch 9, or the switching contact of the latter, is changed over between its positions IN, RA, LA and ADD.

In position IN, only its contact piece 9.1 is in contact with the fixed contact 9.3, and its contact piece 9.2 is free.

In position LA, contact piece 9.1 is likewise in contact with the fixed contact 9.3, and contact piece 9.2 is in contact with the fixed contact. 9.4.

In position RA, contact piece 9.1 is free, and contact piece 9.2 is again in contact with the fixed contact 9.4.

In position ADD, both the contact pieces 9.1, 9.2 of the selector switch 9 are free; for clarification, the dashed representation of the contact pieces in this position is once again assigned the reference symbol ADD.

By tilting the knob 2 out of its longitudinal axis m (cf. FIG. 1):

in direction o, the switching contact 6.1 is brought into contact with the fixed contact 6.2, the switching contact 7.1 is brought into contact with the fixed contact 7.2 and the switching contact 8.1 is brought into contact with the fixed contact 8.2;

in direction u, the switching contact 6.1 is brought into contact with the fixed contact 6.3 and the switching contact 7.1 is brought into contact with the fixed contact 7.3, while the switching contact 8.1 remains potential-free;

in direction r, the switching contact 7.1 remains unactuated and therefore potential-free, while the switching contact 6.1 is brought into contact with the fixed contact 6.3 and the switching contact 8.1 again remains potential-free;

in direction 1, the switching contact 7.1 likewise remains unactuated and therefore potential-free, while the switching contact 6.1 is brought into contact with the fixed contact 6.2 and the switching contact 8.1 is brought into contact with the switching contact 8.2.

A four lead cable L is connected to the connection terminals 11 to 14 for transmission of the binary code present at these terminals to a decoding and control circuit DEC. The latter is in turn part of a mirror-position memory circuit MEM, which for its part is connected to a keypad KEY, arranged within the user's reach. The data transfer necessary in both directions between DEC and MEM—which consists in particular of electric mirror-position signals—is indicated by a double-headed arrow. DEC includes the circuits for converting the binary code into actuating signals and all the power output stages/motor drivers, while in MEM the mirror positions can be stored electrically and called up by key depression via KEY, as already mentioned.

Two outside rear-view mirrors 15 and 17 as well as an inside rear-view mirror 16 each have two fine-adjusting devices, 15.1, 15.2 and 17.1, 17.2 as well as 16.1 and 16.2, in addition to electrical position sensors, for example potentiometer displacement or angle sensors 18.1-18.6, which are all connected to the decoding and control circuit DEC in a known way. The arrangement to this extent corresponds to the control device defining the generic type and is therefore not explained in any further detail here.

In addition, the two outside rear-view mirrors 15 and 17 also each have a further adjusting device, 15.3 and 17.3 respectively, which are provided, in a way not shown in any further detail, for extending and retracting these mirrors relative to the body of the motor vehicle, and likewise can be controlled by means of the decoding and control circuit DEC.

Upon actuation of the knob 2, the signal permutations, evident from the following table, of the four-digit binary code, already mentioned several times, to be fed to the decoding and control circuit DEC via the cable L, are produced at the four connection terminals 11, 12, 13 and 14 of the switch arrangement, with, for clarification, "no potential" being symbolized by (logical) "0" and "potential of the joint connection terminal 10" being symbolized by (logical) "1":

| Position of the knob: | | | | | {Tip Switches 7, 8} 11, 12 | | {Selector Switch 9} | |
|---|---|---|---|---|---|---|---|---|
| LA | IN | RA | ADD | /m | 0 | 0 | 13 | 14 |
|    |    |    |     |    |   |   | 0  | 0  |
| LA | —  | —  | —   | /o | 1 | 1 | 1  | 1  |
|    |    |    |     | /u | 1 | 0 | 1  | 1  |
|    |    |    |     | /r | 0 | 0 | 1  | 1  |
|    |    |    |     | /l | 0 | 1 | 1  | 1  |
| —  | IN | —  | —   | /o | 1 | 1 | 1  | 0  |
|    |    |    |     | /u | 1 | 0 | 1  | 0  |
|    |    |    |     | /r | 0 | 0 | 1  | 0  |
|    |    |    |     | /l | 0 | 1 | 1  | 0  |
| —  | —  | RA | —   | /o | 1 | 1 | 0  | 1  |
|    |    |    |     | /u | 1 | 0 | 0  | 1  |
|    |    |    |     | /r | 0 | 0 | 0  | 1  |
|    |    |    |     | /l | 0 | 1 | 0  | 1  |
| —  | —  | —  | ADD | /o | 1 | 1 | 0  | 0  |
|    |    |    |     | /u | 1 | 0 | 0  | 0  |
|    |    |    |     | /r | 0 | 0 ←ZERO→ | 0 | 0 |
|    |    |    |     | /l | 0 | 1 | 0  | 0  |

In addition, the position "ADD / r" is marked as a ZERO position, because there, as already mentioned and evident above, when the knob is actuated in the corresponding direction the same "null" permutation code is produced as with the knob in the neutral or rest position.

The two connection terminals 13 and 14 connected downstream of the selector switch provide address information or address bits in binary code, by which the mirror to be adjusted or the additional, superimposed function is selected. The regularly permutatable bits at the terminals 11 and 12 denote the function to be performed itself, that is to say rotate the mirror one way or the other about the horizontal or vertical axis.

The above table reveals that, along with the known fine-adjusting operations in selection positions IN, RA and LA, in the additional selection position ADD there are three further distinguishable binary code permutations available, ADD/o, ADD/u and ADD/l. The assignment of these permutations to these directions of movement of the knob can of course be changed by a different layout of the tip switches; for example, as already mentioned at the beginning, the ZERO permutation could occur in the case of ADD/o or ADD/u, while ADD/r and ADD/l could be used in each case for individual retraction of the outside rear-view mirrors and the permutation in the case of ADD/u or ADD/o could be used for the joint extension of the outside rear-view mirrors. Moreover, as noted previously, if both outside rear-view mirrors are always retracted and extended jointly, utilizing only two of the additional permutations, the third additional permutation can also be used advantageously to cause a mirror position memory circuit, provided in the control device, to store the mirror position which has been set immediately beforehand, in a manner which is well known to those skilled in the art. In order to avoid the user's having to hold onto the knob when extending or retracting the outside rear-view mirrors, the decoding and control circuit DEC may also have a self-holding circuit—not shown in any further detail—which is switched on by actuating the knob 2 in the corresponding directions (ADD/o, ADD/u) and off again after conclusion of the extension or retraction operation, by end-position switches (not shown) mechanically coupled to the adjusting devices 15.3 and 17.3 in a known way.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A control device for the manual adjustment of reversible electrical adjusting devices, in particular of motor vehicle rear-view mirrors, including: a switch arrangement having a selector switch which can be switched by means of a knob between a multiplicity of stable switching positions, and having a switching contact which, in a first stable switching position, is in contact with a first fixed contact of said selector switch, in a second stable switching position is in contact with a second fixed contact of said selector switch, and in a third stable switching position is in contact with the first and the second fixed contacts, one of said fixed contacts of the selector switch being connected to a first outer terminal of the switch arrangement, and the other of said fixed contacts being connected to a second outer terminal of said switch arrangement; first, second and third tip switches each of which is adapted to be switched out of a stable neutral position into unstable switching positions by actuation of said knob in at least one predetermined direction, each of said tip switches having a switching contact and at least one fixed contact, all of said fixed contacts of said top switches being connected to a joint outer connection terminal, which is connected to a source of fixed electric potential; the switching contact of the first tip switch being connected electrically in series with the switching contact of the selector switch and, upon actuation connecting the latter to an electric potential of the joint connection terminal in each of said first, second and third stable switching positions of the knob; and the switching contacts of the second and third tip switches being connected respectively to third and fourth outer terminals of the switch arrangement; whereby a four-digit binary code, is generated at said first, second, third and fourth outer terminals, with the output at each terminal assuming a value of one or zero dependent on whether or not the respective terminal is connected via said selector switch and tip switches to said joint connection terminal, which is dependent on the set stable switching position of the selector switch and the switching positions of the tip switches, said code having at least twelve permutations; wherein the improvement comprises:

a fourth stable switching position of the selector switch which can be switched into by means of the knob, in which position the switching contact of the said selector switch is not in contact with any of the fixed contacts thereof, so that the assigned first outer terminal and second outer terminal remain potential-free, regardless of the positions of said tip switches.

2. Control device according to claim 1, wherein stable switching positions of the selector switch can be switched into by turning the knob about its longitudinal axis, and wherein the fourth switching position of the selector switch is arranged outside the turning range of said knob which comprises the shortest path connecting the three other switching positions.

3. Control device according to claim 2, wherein the selector switch has a central stable switching position for selection of a mirror to be adjusted, and wherein the fourth switching position of the selector switch is offset by 180° with respect to the central switching position.

4. Control device according to claim 3, wherein at least one of said rear-view mirrors of the motor vehicle is an outside rear-view mirror, which can be controlled for mirror adjustment by means of a decoding and control circuit connected to said first, second, third and fourth outer terminals of the switch arrangement, wherein an additional adjusting device of said outside rear-view mirror for retracting or extending at least this outside rear-view mirror against or away from the body of the motor vehicle is activated when said knob is switched into the fourth switching position, dependent on its actuating direction.

5. Control device according to claim 2, wherein at least one of said rear-view mirrors of the motor vehicle is an outside rear-view mirror, which can be controlled for mirror adjustment by means of a decoding and control circuit connected to said first, second, third and fourth outer terminals of the switch arrangement, wherein an additional adjusting device of said outside rear-view mirror for retracting or extending at least this outside rear-view mirror for retracting or extending at least this outside rear-view mirror against or away from the body of the motor vehicle is activated when said knob is switched into the fourth switching position, dependent on its actuating direction.

6. Control device according to claim 1, wherein at least one of said rear-view mirrors of the motor vehicle is an outside rear-view mirror, which can be controlled for mirror adjustment by means of a decoding and control circuit connected to said first, second, third and fourth outer terminals of the switch arrangement, and wherein said control device further comprises additional adjusting means for retracting or extending at least this outside rear-view mirror against or away from the body of the motor vehicle, said adjusting means being activated upon actuation of said knob after it has been switched into the fourth switching position.

7. Control device according to claim 6 comprising at least two outside rear-view mirrors, with said additional adjusting means being activated to retract at least a first one of said outside rear-view mirrors when the knob is switched into the fourth switching position and is actuated in one actuating direction; said additional adjusting means being activated to retract at least a second one of said outside rear-view mirrors when the knob is switched into the fourth switching position and is actuated in a second actuating direction; and said additional adjusting means being activated to extend said at least two outside rear-view mirrors away from the body of the motor vehicle when the knob is switched into the fourth switching position and is actuated in a third actuating direction.

8. Control device according to claim 4, wherein a decoding and control circuit for mirror adjustment is connected to the outer terminals of the switch arrangement, and is part of a mirror-position memory circuit adapted to store a mirror position set beforehand by means of the knob and electrically detected by position sensors in response to actuation of knob, in a predetermined direction while said knob is in the fourth switching position, selection of the memory location to be occupied in the memory circuit being performed by means of a separate keypad.

9. Control device according to claim 6, wherein a decoding and control circuit for mirror adjustment is connected to the outer terminals of the switch arrangement, and is part of a mirror-position memory circuit adapted to store a mirror position set beforehand by means of the knob and electrically detected by position sensors in response to actuation of knob in a predetermined direction while said knob is in the fourth switching position, selection of the memory location to be occupied in the memory circuit being performed by means of a separate keypad.

10. Control device according to claim 9, wherein said knob is designed as a pointer.

11. Control device according to claim 1, wherein said knob is designed as a pointer.

12. Control device according to claim 1, wherein at least two of said rear view mirrors are outside rear view mirrors, said control device further comprising:
    an additional adjusting device responsive to said four digit binary code for retracting said at least two outside rear view mirrors in response to actuation of said knob in a first direction after said knob has been switched into said fourth switching position, and for extending said at least two outside rear view mirrors in response to actuation of said knob in a second direction after said knob has been switched into said fourth switching position; and
    a mirror position memory circuit responsive to said four digit binary code and adapted to store a most recently set mirror position in response to actuation of said knob in a third direction after said knob has been switched into said fourth position.

13. Control device according to claim 1, wherein said knob has arranged thereon a symbol adapted to indicate its position, and adapted to be illuminated by a light source.

* * * * *